United States Patent [19]
Okubo

[11] Patent Number: 5,500,565
[45] Date of Patent: Mar. 19, 1996

[54] DRIVE CIRCUIT FOR AN ULTRASONIC MOTOR

[75] Inventor: Mitsumasa Okubo, Hino, Japan

[73] Assignee: Olympus Optical Co., Ltd., Tokyo, Japan

[21] Appl. No.: 285,891

[22] Filed: Aug. 4, 1994

Related U.S. Application Data

[63] Continuation of Ser. No. 24,070, Feb. 24, 1993, abandoned.

[30] Foreign Application Priority Data

Feb. 26, 1992 [JP] Japan ................................. 4-039677
Dec. 25, 1992 [JP] Japan ................................. 4-347021

[51] Int. Cl.$^6$ ................................................ H02N 2/00
[52] U.S. Cl. .................................... 310/316; 318/116
[58] Field of Search .............................. 310/316–318; 318/116

[56] References Cited

U.S. PATENT DOCUMENTS

| | | | |
|---|---|---|---|
| 4,713,571 | 12/1987 | Suzuki et al. | 310/316 |
| 4,749,896 | 6/1988 | Suzaki et al. | 310/316 |
| 5,013,982 | 5/1991 | Sasaki | 318/116 |
| 5,023,526 | 6/1991 | Kuwabara et al. | 318/116 |
| 5,101,144 | 3/1992 | Hirotomi | 318/116 |
| 5,159,223 | 10/1992 | Suganuma | 310/316 |
| 5,162,708 | 11/1992 | Naito et al. | 318/116 |
| 5,165,047 | 11/1992 | Shimizu | 318/116 |
| 5,214,339 | 5/1993 | Naito | 310/316 |

FOREIGN PATENT DOCUMENTS

| | | | |
|---|---|---|---|
| 59-204477 | of 1984 | Japan | H02N 11/00 |
| 61-251490 | of 1986 | Japan | H02N 2/00 |
| 63-234881 | of 1988 | Japan | H02N 2/00 |
| 0214276 | 8/1989 | Japan | 310/318 |
| 0026284 | 1/1990 | Japan | 310/318 |

*Primary Examiner*—Thomas M. Dougherty
*Attorney, Agent, or Firm*—Louis Weinstein

[57] ABSTRACT

A drive circuit for an ultrasonic motor comprising:

an oscillator;

a periodic signal generator that divides the frequency of a clock sent from the oscillator and generates a periodic signal having a specified frequency;

an ac voltage generator that uses the periodic signal to generate an ac voltage for driving the ultrasonic motor;

a monitor device attached to the ultrasonic motor to provide a monitor output indicating an operating state of the ultrasonic motor;

a timing signal generator that generates a signal in accordance with the timing that the ac voltage reaches a specified value within a period thereof;

a comparator that in response to the timing signal sent from the timing signal generator, compares the monitor output with a specified value which is not zero; and a frequency control that controls the frequency of the periodic signal in accordance with an output of the comparator.

37 Claims, 10 Drawing Sheets

DRIVE CIRCUIT FOR AN ULTRASONIC MOTOR

This is a continuation of application Ser. No. 08/024,070, filed Feb. 24, 1993 now abandoned.

BACKGROUND OF THE INVENTION

1. Field of the Invention

The present invention relates to a drive circuit for an ultrasonic motor and a drive control method for an ultrasonic motor. More particularly, this invention is concerned with a drive circuit for an ultrasonic motor and a drive control method for an ultrasonic motor that can control the driving frequency for an ultrasonic motor which varies depending on temperature, load, or the like so as to achieve optimal lock-on.

2. Description of the Related Art

Various drive circuits for an ultrasonic motor have been proposed in the past. For example, Japanese Patent Laid-Open No.59-204477 has disclosed a technological means, wherein based on the fact that the voltage value of a monitor signal becomes maximum at a resonance frequency of an oscillator in an ultrasonic motor, the voltage value of the monitor signal is monitored, and an ultrasonic motor is driven at a resonance frequency or frequencies in a band slightly higher than the resonance frequency in accordance with the monitored voltage value.

The present applicant has disclosed in Japanese Patent Laid-Open No.63-234881 a technological means that uses a signal sent from a frequency divider, which generates drive voltage for an ultrasonic motor, to detect a phase of a monitor signal, and, similarly to the disclosure in Japanese Patent Laid-Open No.61-251490, drives the ultrasonic motor at a resonance frequency or frequencies in a band slightly higher than the resonance frequency in accordance with the detected phase of the monitor signal.

In the disclosure of Japanese Patent Laid-Open No.59-204477, as shown herein in FIG. 10, the voltage V of a monitor signal is monitored during an interval between frequencies f1 and f2; that is, a control frequency range, and then frequency control is carried out. The voltages of the points $P_{A1}$ and $P_{A2}$ on the monitor signal associated with the frequencies before and after a resonance frequency fR, for example, frequencies fA1 and fA2 in FIG. 10 are the same or $V_A$. Therefore, when the voltage of the monitor signal is $V_A$, unless the frequency f is shifted to a higher or lower frequency in order to look at the tendency of the voltage of the monitor signal, it is uncertain in which direction a driving frequency should be shifted. This means that it takes much time to lock onto an optimal frequency. It is very hard to control a frequency precisely and quickly.

According to the disclosures of Japanese Patent Laid-Open Nos.61-251490 and 63-234881, as shown herein in FIG. 11, since the direction in which a phase θ of a monitor signal shifts becomes constant around the resonance frequency $f_R$, the direction in which a frequency should be shifted can be determined as soon as the phase θ of the monitor signal is detected. This control method makes it possible to perform frequency lock-on more rapidly and precisely than the method based on the voltage of the monitor signal disclosed in Japanese Patent Laid-Open No.59-204477.

As shown in FIG. 11, in the vicinity of the resonance frequency $f_R$, the phase θ of the monitor signal has a relationship of increasing in the lagging direction with increase with the frequency f; that is, when the frequency f gets higher, the phase of the monitor signal lags further behind. However, when the frequency f is made still higher and is shifted to a higher frequency than a frequency $f_p$ in FIG. 11, the phase θ of the monitor signal changes toward leading. Therefore, even if an attempt is made to control a frequency within a normal control frequency range of f1 to f2 and to converge the frequency to the state of a point PC1; that is, a frequency $f_{C1}$, the frequency may be converged to the state of a point $P_{C2}$; that is, a frequency $f_{C2}$, by mistake.

Therefore, when an ultrasonic motor is operated at a frequency, especially, in a stable band higher than a resonance frequency, a setting range between frequencies f1 and f2 is limited or a target phase value is restricted.

However, when the foregoing ultrasonic motor is incorporated in a camera lens and operated at varying temperatures from a low temperature to a high temperature, or when the lens is subjected to a drastically varying load because of an accessory or the like attached to the distal end thereof, the control frequency range of f1 to f2 must be reserved widely. In this case, the disclosures proposed in Japanese Patent Laid-Open Nos. 61-251490 and 63-234881 cannot lock onto an optimal frequency in a stable and highly efficient manner.

OBJECTS AND SUMMARY OF THE INVENTION

The first object of the present invention is to provide a drive circuit and a drive control method for an ultrasonic motor that even if a range of a control frequency for driving an ultrasonic motor is reserved widely, can rapidly and precisely provide an optimal frequency for driving the ultrasonic motor.

The second object of the present invention is to provide a drive circuit and a drive control method for an ultrasonic motor that, when used for equipment which require a wide frequency range for driving an ultrasonic motor because such parameters as supply voltage, temperature, and load varies drastically but a constant oscillatory state must be retained, can provide an optimal driving frequency rapidly and precisely.

The third object of the present invention is to provide a drive circuit and a drive control method for an ultrasonic motor that, even when a control frequency range is reserved widely, can provide an optimal driving frequency rapidly and precisely and be constructed very simply and compactly and at low cost.

The fourth object of the present invention is to provide a drive circuit and a drive control method for an ultrasonic motor that, even when the characteristics of an ultrasonic motor contain some extent of individual variations, can drive each ultrasonic motor in an optimal state.

The fifth object of the present invention is to provide a drive circuit and a drive control method for an ultrasonic motor that can reduce the number of parts, and support a CPU with a built-in timer counter which has gained popularity recently.

The sixth object of the present invention is to provide a drive circuit and a drive control method for an ultrasonic motor that can provide excellent responsiveness and detect a precise monitor signal.

The seventh object of the present invention is to provide a drive circuit and a drive control method for an ultrasonic motor that, even when an ultrasonic motor fails to rotate due to an abrupt load variation, can re-energize the ultrasonic motor.

Briefly, the present invention provides a drive circuit for an ultrasonic motor comprising:

an oscillator;

a periodic signal generating means that divides the frequency of a clock sent from the oscillator and generates a periodic signal having a specified frequency;

an ac voltage generating means that uses the periodic signal to generate an ac voltage for driving the ultrasonic motor;

a monitor means that is attached to the ultrasonic motor and provides a monitor output indicating an operating state of the ultrasonic motor;

a timing signal generating means that generates a signal in accordance with the timing that the ac voltage reaches a specified value within the period thereof;

a comparing means that, in response to the timing signal sent from the timing signal generating means, compares the monitor output with a specified value which is not zero; and a frequency control means that controls the frequency of the periodic signal in accordance with an output of the comparing means.

The above, as well as other objects and advantages of the present invention, will be further clarified from the detailed description below.

DETAILED DESCRIPTION OF THE PREFERRED EMBODIMENTS

First, prior to presenting a detailed description of the embodiments of the present invention, a basic construction of a drive circuit for an ultrasonic motor of the present invention will be described.

Figure 1:
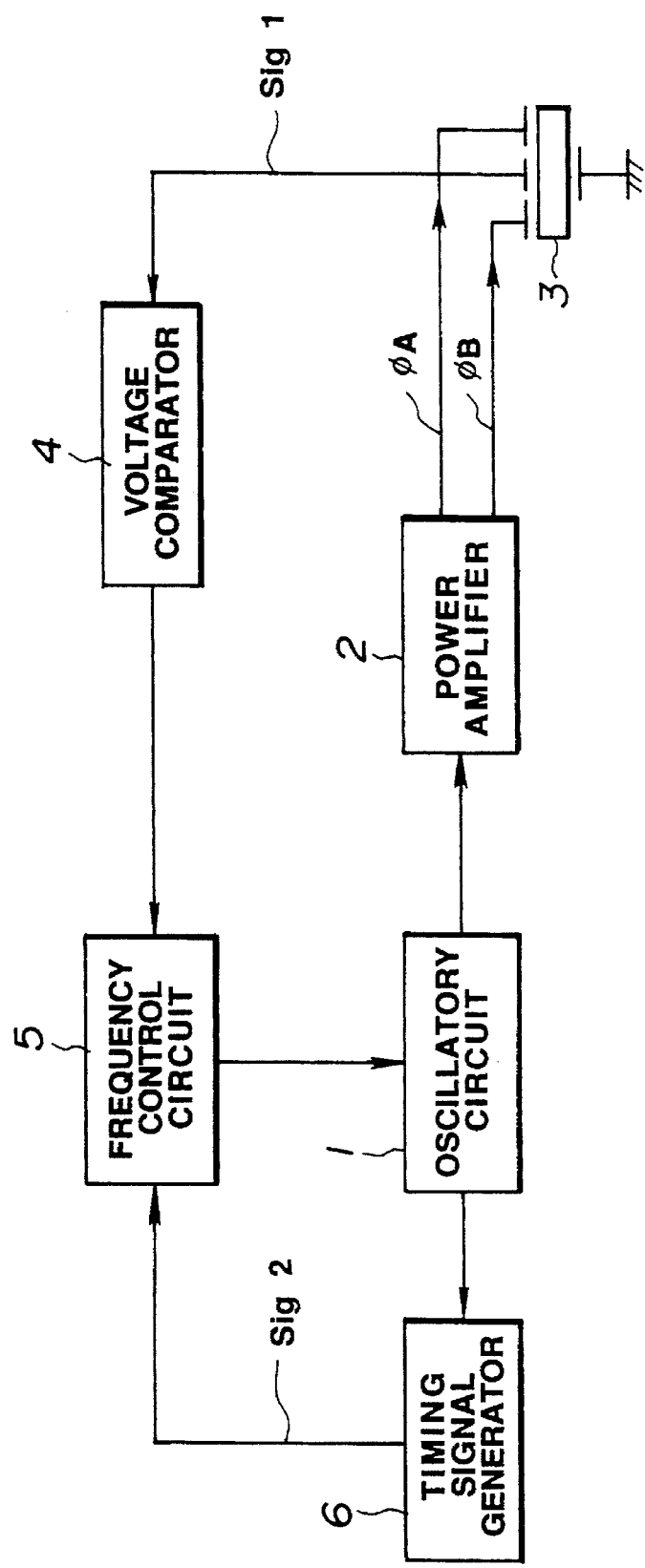
FIG. 1 is a conceptual diagram showing a basic construction of the present invention.

The drive circuit for an ultrasonic motor has a construction shown in the conceptual diagram of FIG. 1. Specifically, the drive circuit is designed for an ultrasonic motor 3 including an electromechanical energy transducing element that when applied ac signals $\phi A$ and $\phi B$ having different phases from an oscillator 1 via a power amplifier 2, generates a progressive oscillatory wave on a surface of an elastic body, and an electromechanical energy transducing element for monitoring that is activated with the progressive oscillatory wave and outputs a monitor signal Sig1 indicating a state of the progressive oscillatory wave.

The drive circuit comprises a voltage comparator 4 having a comparison voltage different from a neutral or reference voltage of the monitor signal Sig1, a timing signal generator 6 that generates a timing signal Sig2 indicating predetermined timing using the ac signals or a signal for producing the ac signals, a frequency control circuit 5 that controls the frequencies of the ac signals $\phi A$ and $\phi B$ on the basis of the outputs of the voltage comparator 4 and timing signal generator 6 in such a manner that the voltage of the monitor signal Sig1 will agree with the comparison voltage in accordance with the predetermined timing.

A drive control method for an ultrasonic motor of the present invention is designed for an ultrasonic motor including an electromechanical energy transducing element that, when driven by two ac signals having different phases, generates a progressive oscillatory wave on a surface of an elastic body, and an electromechanical energy transducing element for monitoring that is activated with the progressive oscillatory wave and outputs a monitor signal indicating a state of the progressive oscillatory wave. In the drive control method, a comparison voltage that is different from a neutral or reference voltage of the monitor signal is compared with the voltage of a timing signal that is generated using the ac signals or a signal for producing the ac signals and indicates predetermined timing. Based on the result of the comparison, the frequencies of the ac signals are controlled.

What is referred to as reference voltage herein is an intermediate or reference voltage substantially equi-distant between a maximum point and a minimum point on a monitor signal of an ac voltage, and serves as a reference point relative to which the ac voltage oscillates. In short, the neutral or reference voltage is a voltage value of the monitor signal unaffected by vibration of a motor.

In the drive circuit for an ultrasonic motor, the frequency control circuit controls the frequencies of ac signals on the basis of the outputs of the voltage comparator and timing signal generator so that the voltage of the monitor will agree with the comparison voltage in accordance with the timing.

In the drive control method for an ultrasonic motor, the timing signal is compared with the comparison voltage, and the frequencies of the ac signals are controlled in accordance with the result of the comparison.

Here, a basic concept of optimization of a driving frequency in the drive circuit and drive control method for an ultrasonic motor in which the present invention is implemented will be described.

Figure 2A:
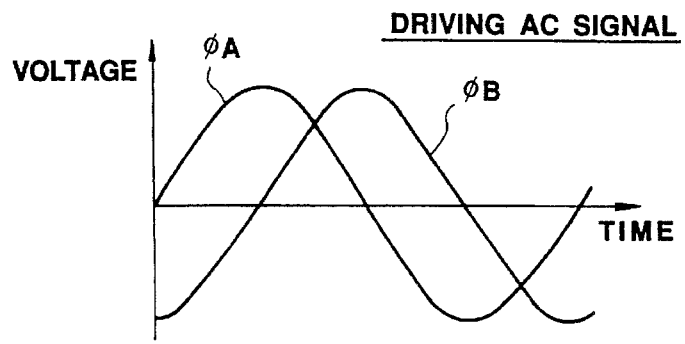
FIG. 2A is a graph showing an example of waves of ac signals applied to an ultrasonic motor to which the present invention applies.
Figure 2B:
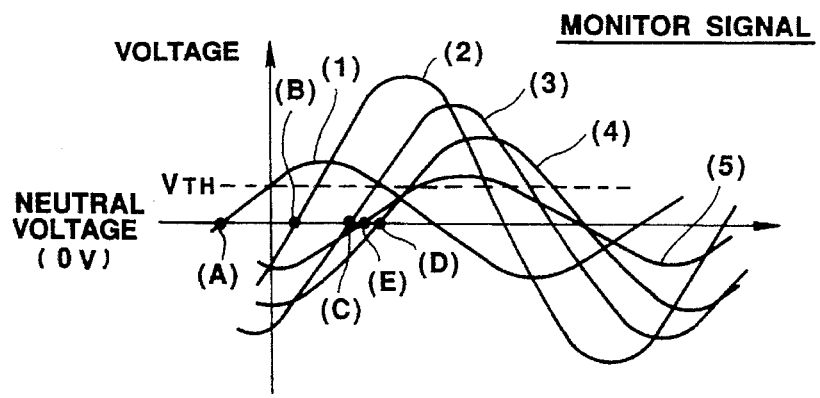
FIG. 2B is a graph showing the waves of a monitor signal sent from the ultrasonic motor.
Figure 2C:
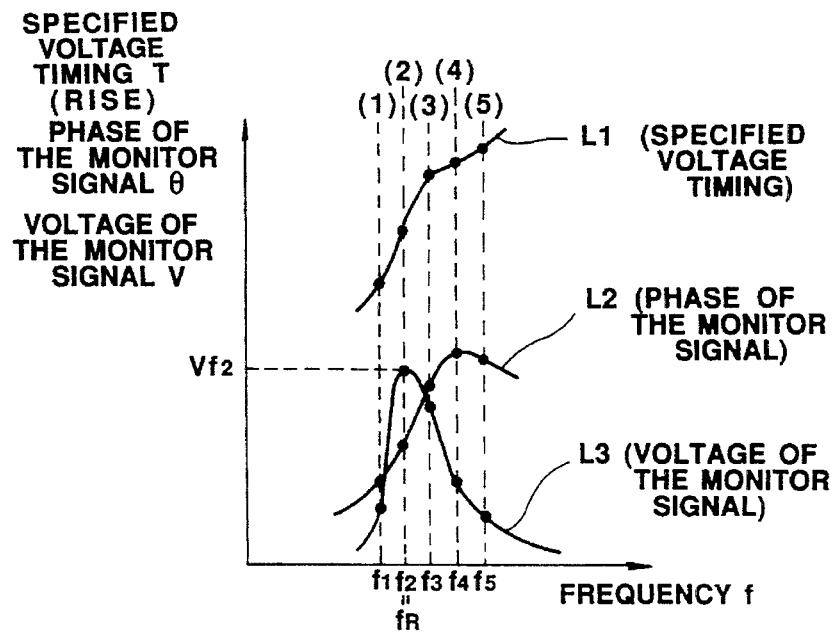
FIG. 2C is a graph showing the relationship among the driving frequency for the ultrasonic motor, the voltage and phase of the monitor signal, and the timing of phasing at a specified voltage.

FIG. 2A is a graph showing examples of waves of driving ac signals applied to an ultrasonic motor to which the present invention applies. FIG. 2B is a graph showing the waves of a monitor signal sent from the ultrasonic motor. FIG. 2C is a graph showing the relationship between the driving frequency for the ultrasonic motor, the voltage and phase of the monitor signal, and the timing of phasing with a predetermined voltage $V_{TH}$ to be described later.

In FIG. 2A, φA and φB are driving ac signals that are applied to an ultrasonic motor and are 90° out of phase with each other.

In FIG. 2B, waves (1) to (5) are associated with resonant states of an ultrasonic motor and represent higher driving frequencies in that order. Timing points (A) to (E) indicates points when the waves (1) to (5) are phased with a neutral or reference voltage (0 V). Herein, the load and temperature shall be constant.

In FIG. 2C, L1, L2, and L3 indicate the timing of phasing with a predetermined voltage $V_{TH}$, the phase of a monitor signal, and the voltage of the monitor signal respectively. Frequencies f1 to f5 are driving frequencies for an ultrasonic motor corresponding to the waves (1) to (5) in FIG. 2B. The frequency f2 represents a resonance frequency $f_R$ of the ultrasonic motor.

As a driving frequency varies, the voltage of a monitor signal (for example, an amplitude or a mean value of a monitor signal) produces, as indicated with L3 in FIG. 2C, a mountainous-shaped curve having a peak at a resonance frequency $f_R$. There is, therefore, a possibility that two points on the voltage curve of the monitor signal have the same value for different frequencies. As described above, therefore, even when the voltage value of the monitor signal is detected, it cannot be determined immediately whether the driving frequency should be shifted to a higher or lower frequency. For example, when the voltage of the monitor signal has been detected as a lower value than a peak voltage $V_{f2}$, it cannot be determined immediately whether the detected wave is shifting toward the wave (1) or (5). To detect a precise frequency, as described above, the frequency f must be shifted to both a higher and a lower frequency in order to check the tendency of the voltage of the monitor signal. Otherwise, it is uncertain in which direction a driving frequency should be shifted. Consequently, it takes excessive time to lock onto an optimal frequency and it is very hard to perform precise frequency control.

On the other hand, a phase of a monitor signal is detected by measuring the times required for the waves (1) to (5) to reach the timing points (A) to (E), i.e. the neutral or reference voltage (0 V) relative to a reference phase of φA or φB. That is to say, when a frequency shifts from (1) to (5) in FIG. 2B, the timing point shifts from (A) to (E) in FIG. 2B. Therein, the direction of a shift from (D) to (E) is reverse to those of other shifts. This is reflected in an area of frequencies f3 to f5 of wave L2 in FIG. 2C.

Therefore, in a driving frequency control method based on the phase of a monitor signal, as indicated with L2 in FIG. 2C, the phase shows that the phase increases in an interval from the wave (1) to (4). When a detected value is compared with a reference value, it is determined immediately in which direction a driving frequency should be shifted. A detected value has, however, a tendency to decrease in an interval between the waves (4) and (5), which causes two points on the curve to have the same value. Therefore, if a reference value to which a frequency should be converged lies in such an area, for example, an area from a frequency f3 to f5 in FIG. 2C, similar to that in the aforesaid method, unless the frequency f is shifted to a higher or lower frequency in order to check the tendency of the phase of the monitor signal, it is uncertain in which direction a driving frequency should be shifted. It takes, therefore, excessive time to lock onto an optimal frequency, and it is very hard to perform frequency control precisely and quickly.

In FIG. 2B, when the timing of reaching a specified voltage is detected by measuring the times required for the waves (1) to (5) to reach a voltage $V_{TH}$ different from the neutral voltage (0 V) used in detecting the phase, the timing shows that the voltage changes in the same direction with changing frequency increase over a wide range of frequencies as indicated with L1 in FIG. 2C. When the frequency of a monitor signal is higher than a resonance frequency fR, the phase thereof leads in some area of frequencies. In this area, however, a rate at which the voltage of the monitor signal drops exceeds a rate at which the phase thereof shifts; that is, leads. Therefore, the timing of reaching a specified voltage keeps lagging behind relatively and increases as indicated with L1 in FIG. 2C. When the frequency of the monitor signal is lower than the resonance frequency $f_R$, the phase thereof shifts greatly. Even if the voltage of the monitor signal fluctuates, the timing of reaching a specified voltage does not change the tendency of an increase.

The underlying theory of the present invention is the foregoing phenomenon. The timing of phasing with a specified voltage $V_{TH}$ changes in the same direction with changing frequency over a wide range of frequencies including a resonance frequency of an ultrasonic motor. Merely by comparing a detected value with a non-zero reference value, a direction in which a driving frequency should be shifted can be calculated promptly. This enables rapid and precise optimization lock-on for a driving frequency.

Embodiments of the present invention will be described with reference to the drawings.

Figure 3:
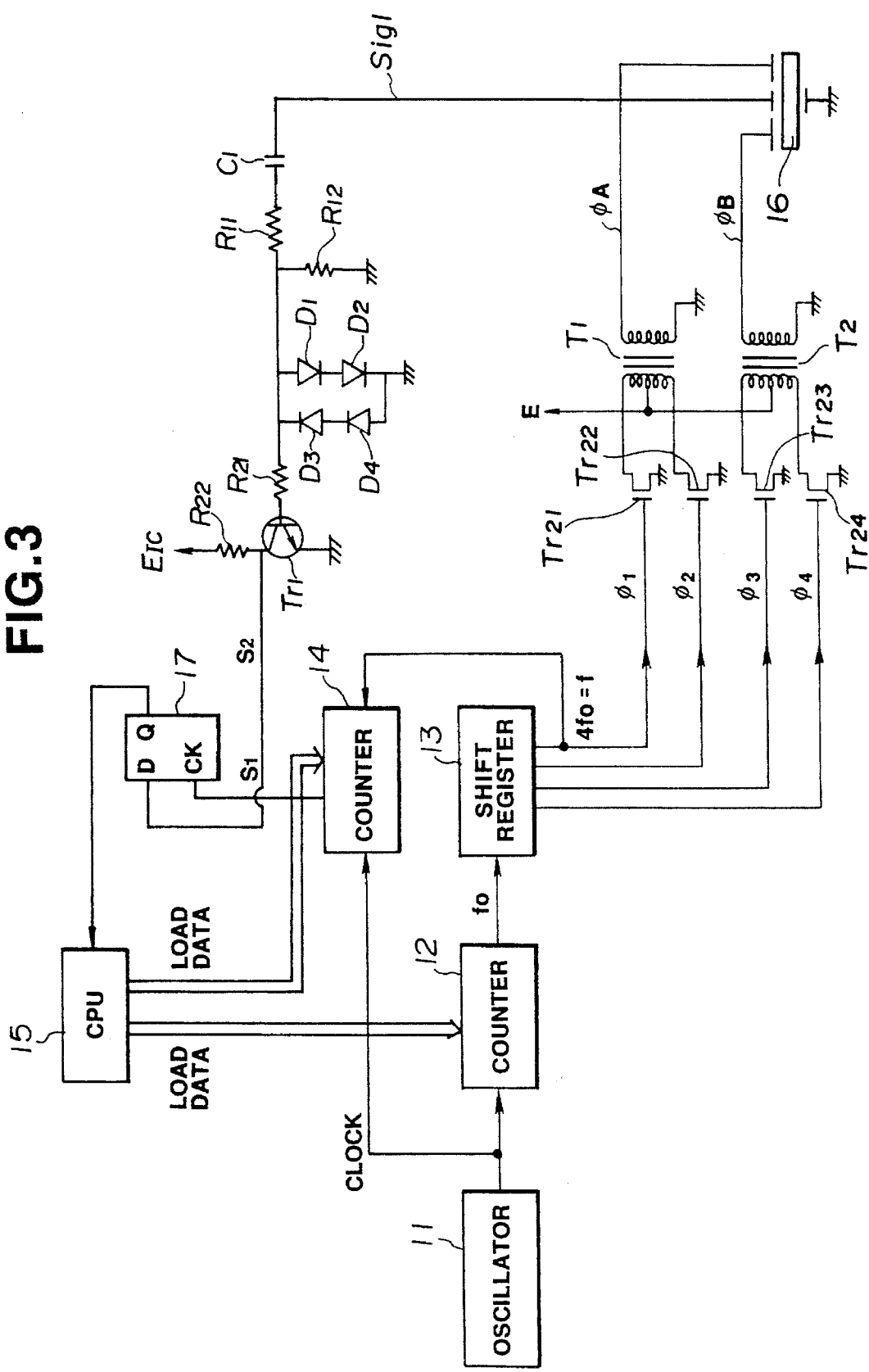
FIG. 3 is an electric circuit diagram showing a drive circuit for an ultrasonic motor representing the first embodiment of the present invention.

FIG. 3 is an electric circuit diagram of an ultrasonic motor drive circuit representing the first embodiment of the present invention.

In FIG. 3, an oscillator 11 generates a high-frequency clock. A counter 12 divides the frequency of the clock sent from the oscillator 11 and generates a periodic signal having a frequency f0. A shift register 13 uses the periodic signal sent from the counter 12 to output four pulse signals of phases φ1 to φ4.

The φ1 to φ4 pulse signals drive transformers T1 and T2 via transistors Tr21 to Tr24. As a result, ac signals each having a period 4f0 are generated and applied as φA and φB ac signals to an ultrasonic motor 16. These signals are detailed in FIG. 4. A counter 14, pre-loaded with a count from CPU 15, is activated with the φ₁ pulse signal from shift register 13 and counts clock pulses derived from oscillator 11, outputting a proposed timing signal S1 when a predetermined count is achieved. Then, counter 14 stops.

A capacitor C1 cuts off dc components from a monitor signal Sig1 sent from the ultrasonic motor 16. Resistors R11 and R12 divided the amplitude of the monitor signal Sig1. Diodes D1 to D4 clip the monitor signal Sig1. A resistor R21 is a protective resistor. A transistor Tr1 is a switching transistor. A resistor R22 is a pull-up resistor.

Figure 4:
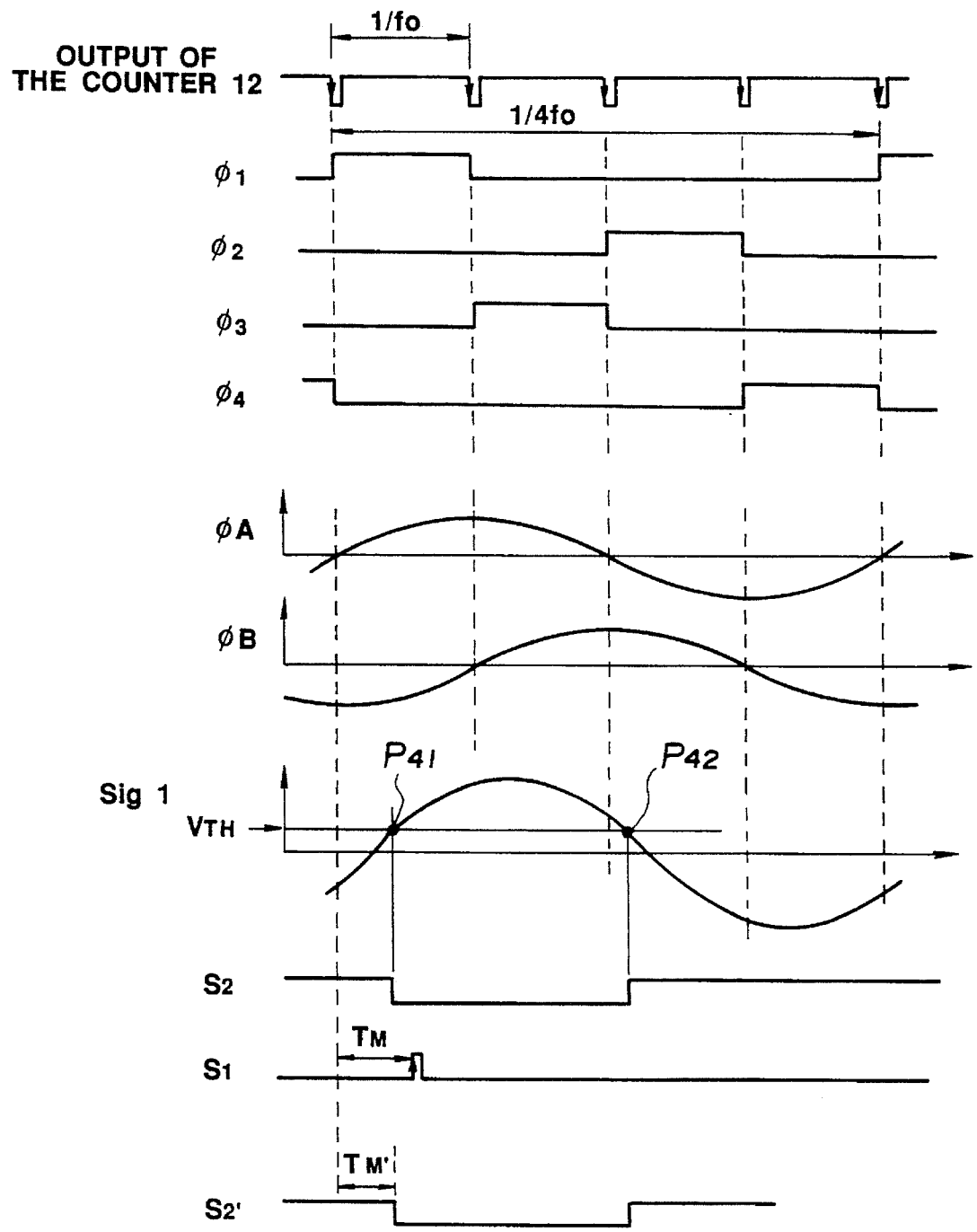
FIG. 4 is a timing chart showing waves in the drive circuit in the first embodiment.

When the monitor signal Sig1 reaches a specified voltage indicated with P41 in FIG. 4, the transistor Tr1 is turned on and a timing signal S2 is driven low. On the other hand, when the monitor signal Sig1 becomes lower than the specified voltage as indicated at P42 in FIG. 4, the transistor Tr1 is turned off and the timing signal S2 is driven high. The diodes D1 to D4 are turned on with voltage above a certain level and restricts voltage so as not to apply high voltage to the base of the transistor Tr1.

In FIG. 3, 17 is a D flip-flop which inputs the timing signal S1 to output a clock or inputs the timing signal S2 to output data. The output Q of the D flip-flop 17 is sent to a CPU 15. The CPU 15 receives an output signal from the D flip-flop 17 and outputs load data to the counters 12 and 14. In FIG. 3, E denotes a power supply for the transformers T1 and T2. $E_{IC}$ denotes a power supply for the pull-up resistor R22.

Next, optimization lock-on for a driving frequency in the first embodiment will be described.

The circuits in the first embodiment are turned on when a monitor signal Sig1 exceeds a multiple of (R11+R12)/R12 of a voltage $V_{BE1}$ between a base and emitter of a transistor Tr1. The voltage corresponding to the multiple is regarded as a specified voltage $V_{TH}$. Normally, $V_{BE1}$ is about 0.7 V. The specified voltage $V_{TH}$ can be set to any value merely by changing the resistances of resistors R11 and R12. When the monitor signal Sig1 exceeds the specified value $V_{TH}$ (P41), a timing signal S2 is driven low.

In order to determine when a timing signal for comparison should be generated, a CPU 15 outputs a value corresponding to a time interval $T_M$ in FIG. 4 as load data to the counters 12 and 14. The counters count input pulses for the load data, and then a counter 14 generates a timing signal S1.

A D flip-flop 17 outputs a data value when the timing signal S1 is generated to indicate timing. The occurrence of the timing signal is determined by the magnitude of the load data and the clock signals (which are of a constant frequency). Therefore, when the timing of reaching a specified voltage leads the timing indicated by the timing signal S1, the D flip-flop 17 provides a low-level output continuously at Q. When the timing of reaching a specified voltage lags behind, the D flip-flop 17 provides a high-level output continuously. When the output of the D flip-flop 17 is low, a driving frequency should be shifted to a higher frequency. When the output thereof is high, the driving frequency should be shifted to a lower frequency. To achieve this shift, the CPU 15 modifies load data applied to the S1 counter 14 so that the monitor signal Sig1 will exceed the specified voltage $V_{TH}$ in accordance with the timing of the timing signal S1. Thus, an ultrasonic motor can be held in an oscillatory state all the time.

The load data that corresponds to the time interval $T_M$ and is applied to the counter 14 may be determined by studying the results of experiments in terms of the type and required specifications of an ultrasonic motor employed.

The ultrasonic motor drive circuit of the first embodiment detects an oscillatory state of an ultrasonic motor in accordance with the timing of reaching a specified voltage, which shows an increase in a given direction over wider frequency band of the voltage or phase of a monitor signal. Therefore, when the ultrasonic motor is employed in equipment, for example, a camera lens in which parameters such as temperature and load vary drastically and a wide range of frequencies must be used to retain a constant oscillatory state, optimization lock-on for a driving frequency can be achieved rapidly and precisely. An ultrasonic motor can be driven in a highly responsive manner and rotated in a stable manner. The CPU 15 can be controlled simply, which enables down sizing and cost saving of a control circuit.

Next, the second embodiment of the present invention will be described.

Figure 5:
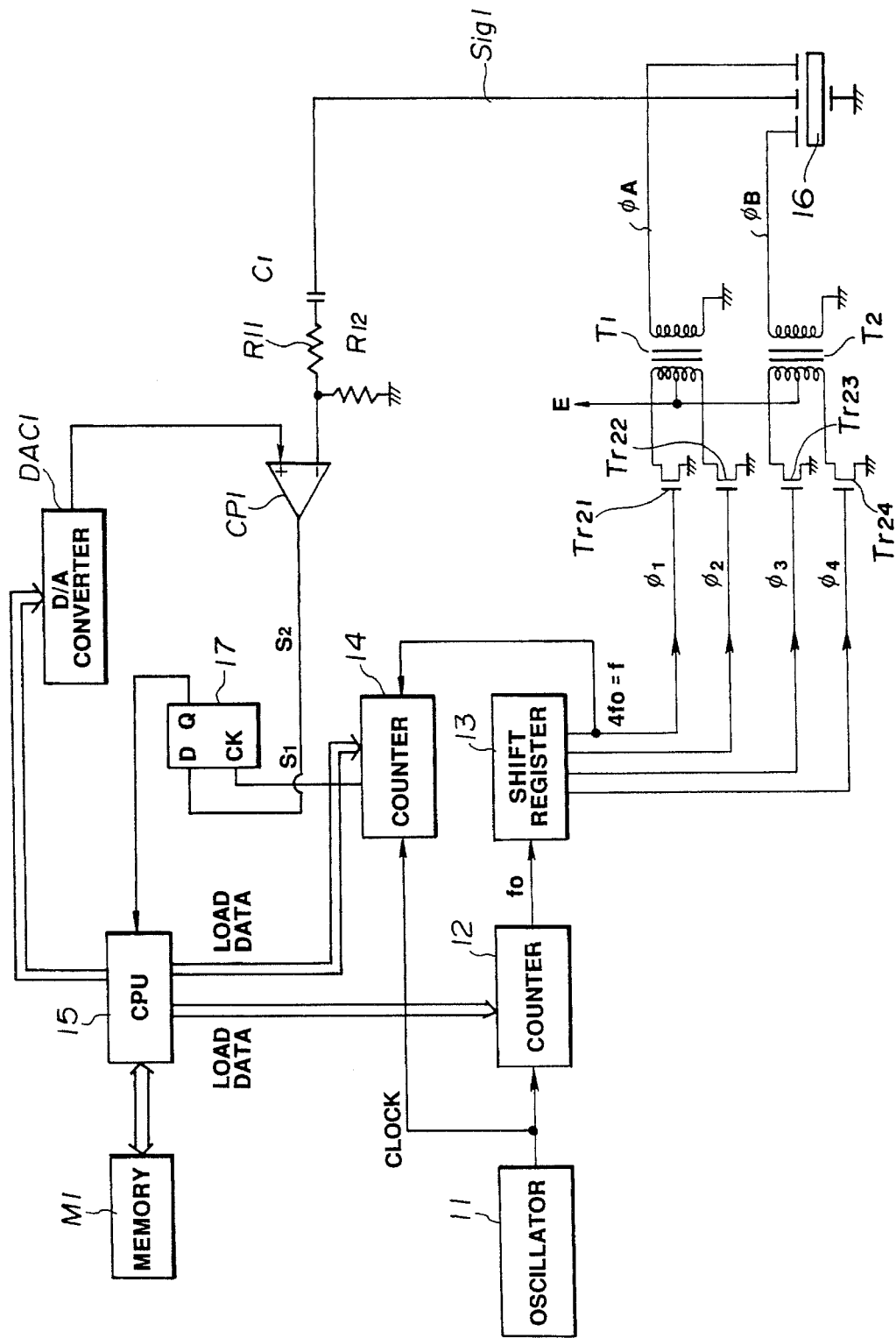
FIG. 5 is an electric circuit diagram showing a drive circuit for an ultrasonic motor representing the second embodiment of the present invention.

FIG. 5 is an electric circuit diagram showing a construction of the second embodiment.

The second embodiment has almost the same construction as the first embodiment, but differs from the first embodiment in a point that a specified voltage $V_{TH}$ is variable.

In FIG. 5, a D/A converter DAC1 generates an analog voltage associated with an output of a CPU 15. A comparator CP1 compares a monitor signal divided by resistors R11 and R12, with an output voltage of the D/A converter DAC1, and outputs the result of the comparison as a digital signal S2. A memory M1 stores a specified voltage $V_{TH}$ optimal to an ultrasonic motor.

An ultrasonic motor has some extent of individual variations in the characteristics thereof. Therefore, the value of a monitor voltage Sig1 may differ among respective ultrasonic motors. In this embodiment, the characteristics of each motor are measured and a specified voltage $V_{TH}$ optimal to the motor is stored in the memory M1. From this viewpoint, the embodiment offers superior mass productivity and enables precise optimization of a frequency. Furthermore, the specified voltage $V_{TH}$ can be changed to any value in conformity with a fluctuation in supply voltage, a variation in temperature or load, or the like.

Next, the third embodiment of the present invention will be described.

Figure 6:
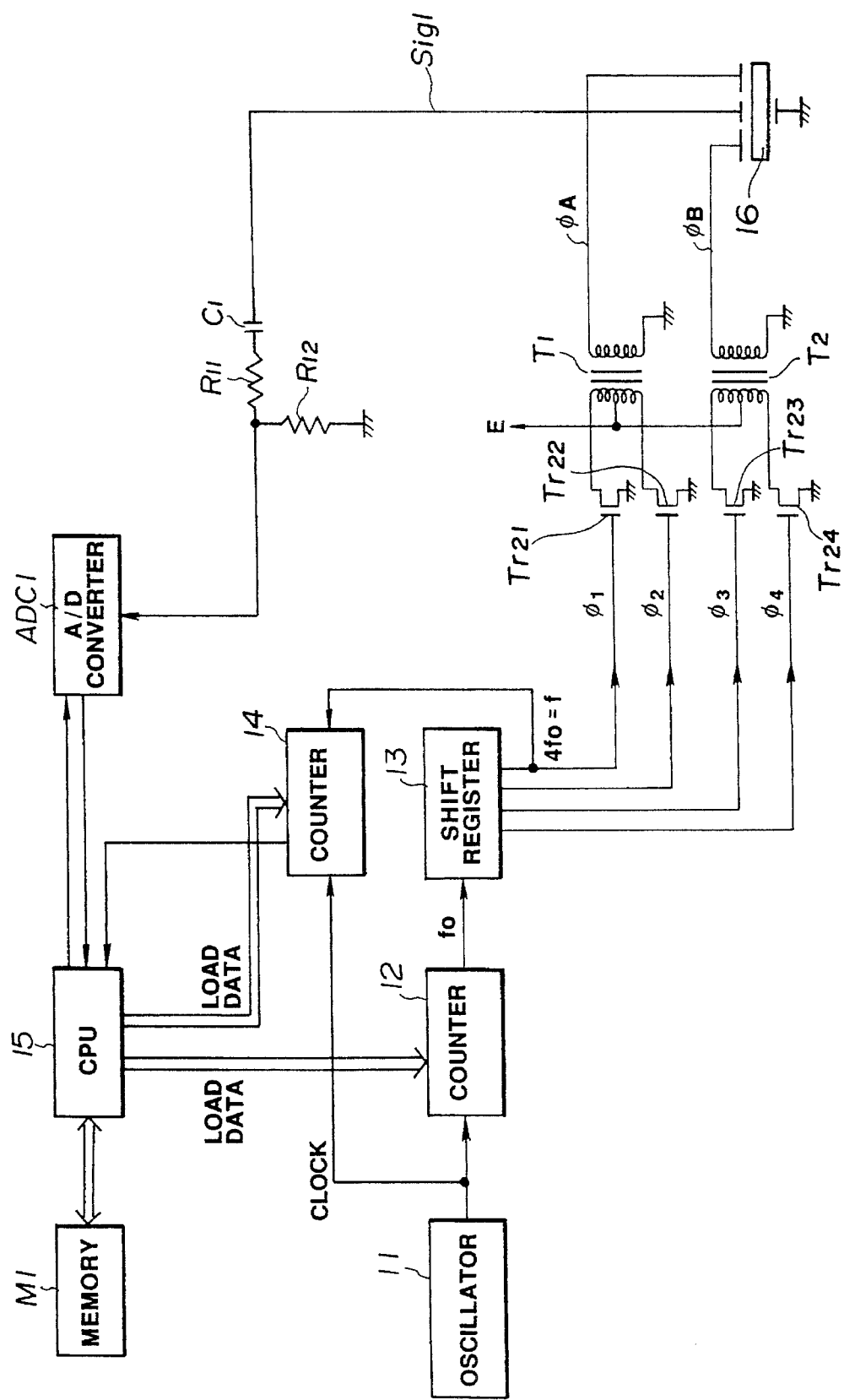
FIG. 6 is an electric circuit diagram showing a drive circuit for an ultrasonic motor representing the third embodiment of the present invention.

FIG. 6 is an electric circuit diagram showing a construction of the third embodiment.

The third embodiment has almost the same construction as the first and second embodiments, but differs from the first and second embodiments in that a digital signal is not compared in accordance with timing but a value of voltage indicating specified timing is measured.

As shown in FIG. 6, a CPU 15 issues an A/D conversion command for a divided signal of Sig1 to an A/D converter ADC1 in synchronization with a timing signal sent to CPU 15 from a counter 14, and fetches the result of conversion. Then, the CPU 15 controls a frequency so that the result of the A/D conversion will agree with a specified value $V_{TH}$ from M1. Thus, the third embodiment provides the same advantages as the first embodiment.

Next, the fourth embodiment of the present invention will be described.

Figure 7:
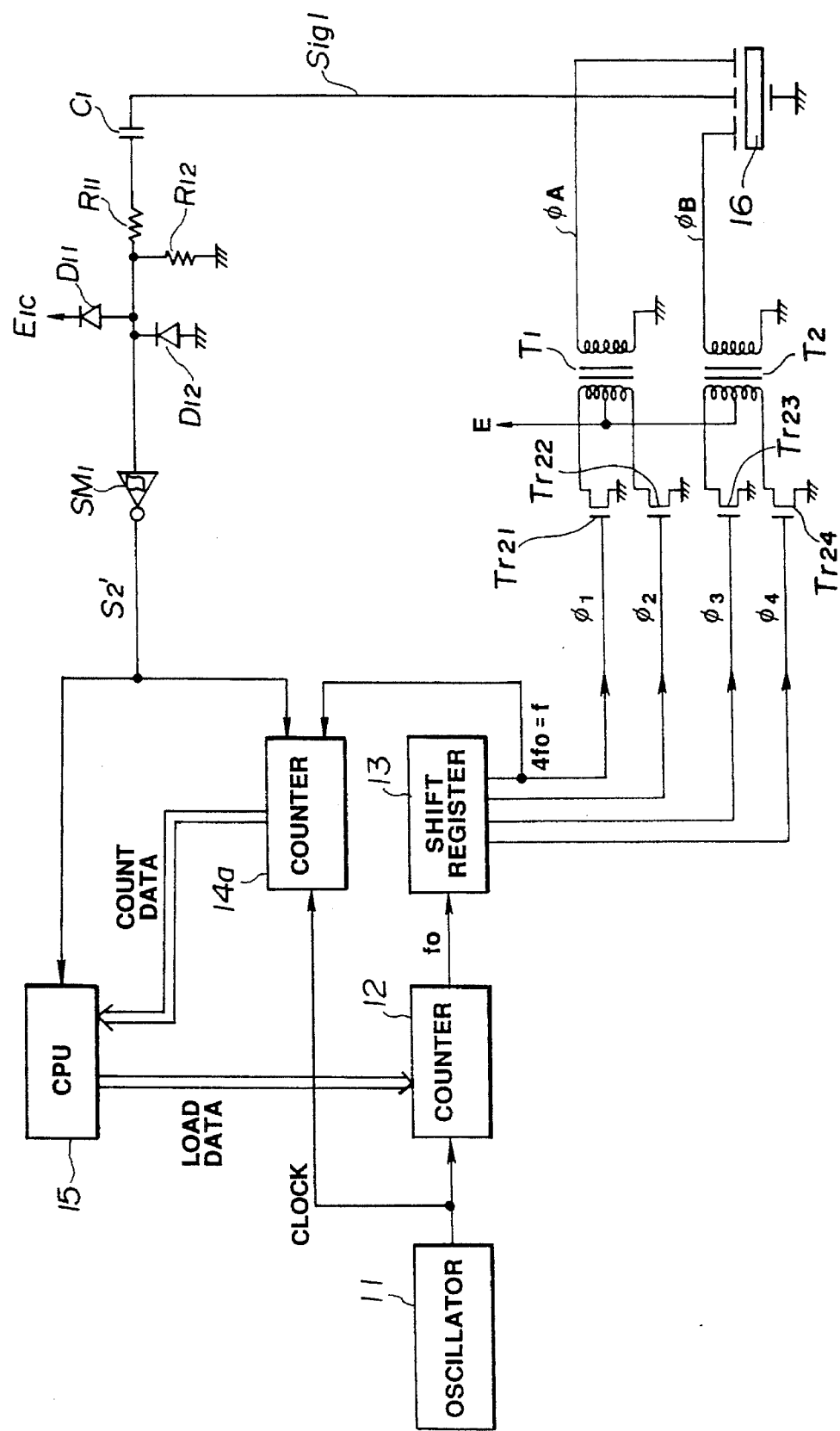
FIG. 7 is an electric circuit diagram showing a drive circuit for an ultrasonic motor representing the fourth embodiment of the present invention.

FIG. 7 is an electric circuit diagram showing a construction of the fourth embodiment.

The fourth embodiment has almost the same construction as the first embodiment, but differs from the first embodiment in a point that a Schmitt trigger SM1 is inserted in a circuit for processing a monitor signal Sig1 and a counter 14a is used to detect the timing that the output of the Schmitt trigger SM1 falls.

The counter 14a is reset and restarted with the rise of a pulse signal φ1 from shift register 13 and stops with the fall of a timing signal S2'. A CPU 15 detects the fall of the timing signal S2' and reads a value of the counter 14a. The read value is regarded as a reference value with which a count value is compared. If a count value is higher than the reference value, a driving frequency is shifted to a lower frequency. If a count value is lower than the reference value, the driving frequency is shifted to a higher frequency.

The fourth embodiment detects the timing that the timing signal S2' falls, which obviates a D flip-flop 17 (See FIG. 3) employed in the first embodiment. Besides, since a CPU with a built-in timer counter which has gained popularity in recent years can be employed, the number of parts for a control circuit can be reduced. This enables further down sizing and cost saving. The use of a Schmitt trigger SM1 prevents chattering of the timing signal S2', which improves responsiveness and enables precise detection of a monitor signal. Furthermore, a quantity of deviation from a target oscillatory state of an ultrasonic motor can be measured, which allows a shift of a driving frequency to be variable. Eventually, the driving frequency can be controlled in a highly responsive manner.

Next, the fifth embodiment of the present invention will be described.

The fifth embodiment has the same construction as the fourth embodiment but operates differently from the fourth embodiment.

Figure 8:
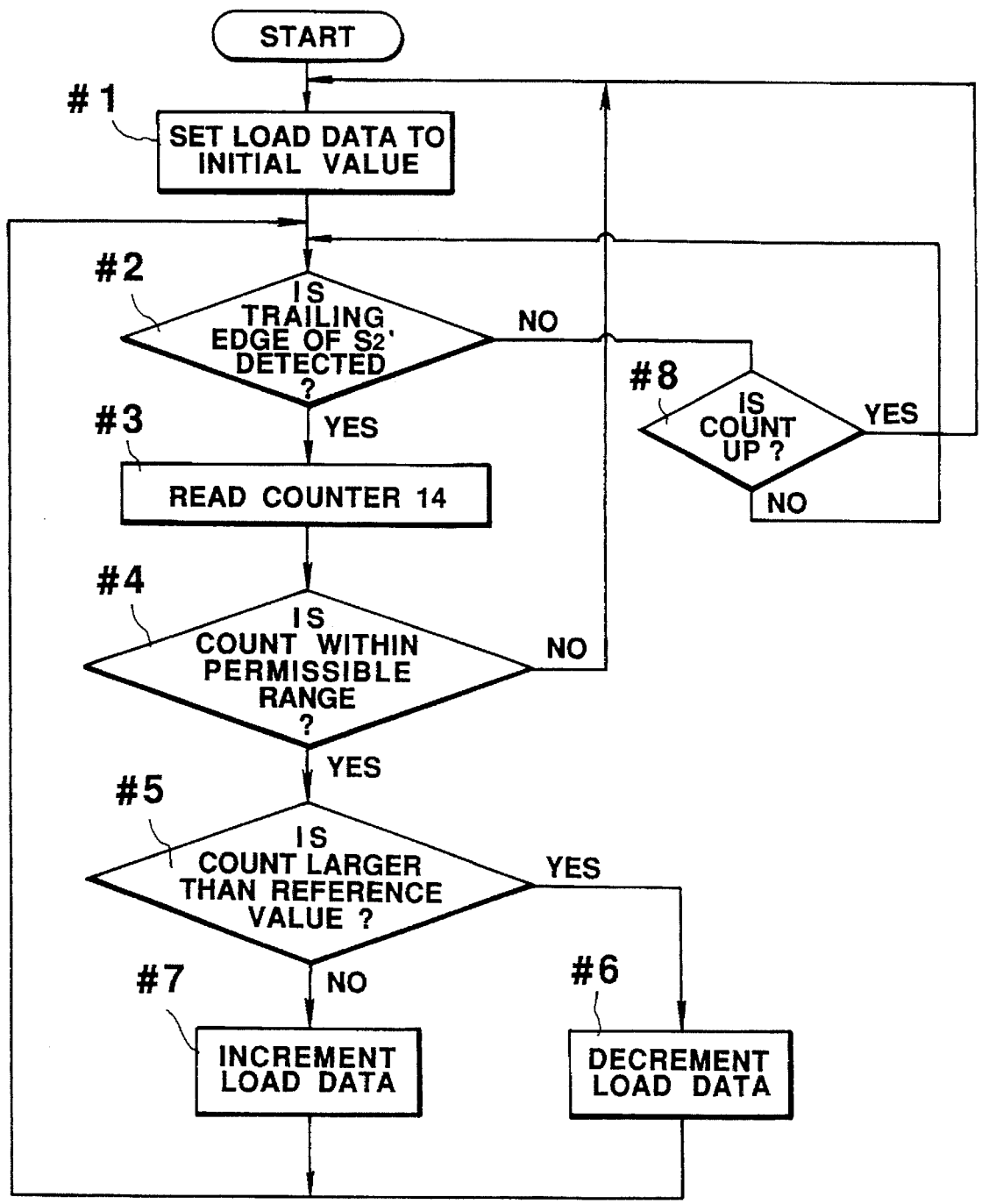
FIG. 8 is a flowchart showing the operation of a drive circuit for an ultrasonic motor representing the fifth embodiment of the present invention.

FIG. 8 is a flowchart showing the operation of a CPU 15 in the fifth embodiment.

Depending on a specified voltage $V_{TH}$, a timing signal S2' may not vary, or more particularly, may not develop a trailing edge or may greatly deviate from a reference value. This is because the abrupt application of load disables the timing signal S2' to follow a quick change in an oscillatory state. The fifth embodiment copes with this problem.

When drive starts, an initial value of load data is set in a counter 12 (step 1). Then, when the fall of the timing signal S2' is detected (step 2), a count value of a counter 14a is read (step 3). It is checked if the count value is within a certain permissible range (step 4). If the count value is within the permissible range, the read count value is compared with a reference value (step 5). If the read value is larger than the reference value, the load data is decremented to lower a driving frequency (step 6). If the read value is smaller, the load data is incremented to raise the driving frequency (step 7).

At step 6, if the count value is outside the permissible range, control returns to the step 1. Then, the initial value of load data is set in the counter 12. If the timing signal S2' does not fall at the step 2, control passes through a step 8. Then, the fall of the timing signal S2' is detected again. At the step 8, the number of loops is counted up. If the timing signal S2' does not fall for a prolonged period of time, control returns to the step 1. Then, the initial value of load data is set in the counter 12.

In the fifth embodiment, processing flows as described above. If the timing signal S2' does not fall or deviates greatly from the reference value, it is determined that an abnormal state occurs. Then, the load data is reset to the initial value. Therefore, even if an ultrasonic motor fails to rotate due to an abrupt load variation, the ultrasonic motor can be restarted.

Next, the sixth embodiment will be described.

The sixth embodiment has the same construction as the third embodiment, but operates differently from the third embodiment.

Figure 9:
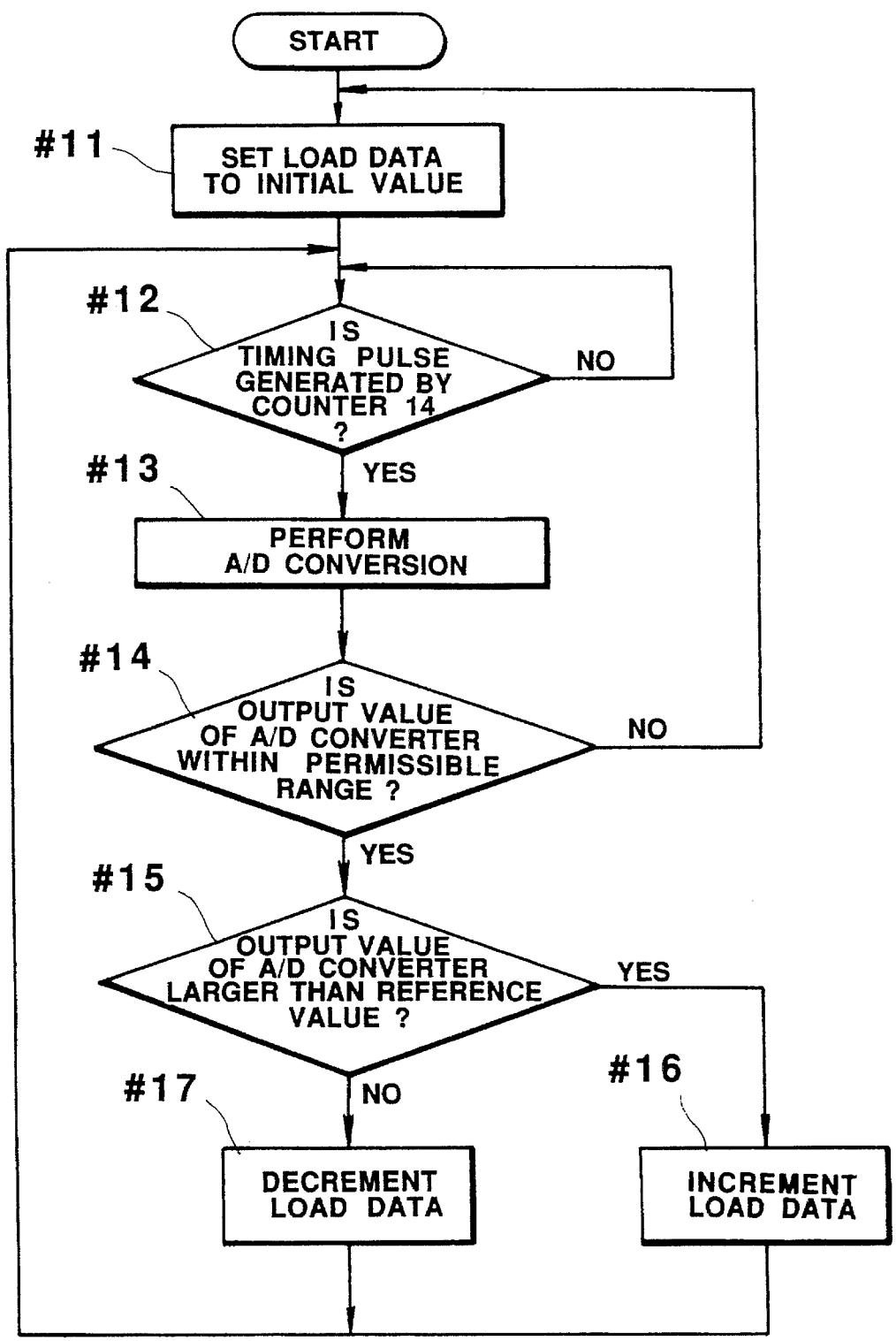
FIG. 9 is a flowchart showing the operation of a drive circuit for an ultrasonic motor representing the sixth embodiment of the present invention.
Figure 10:
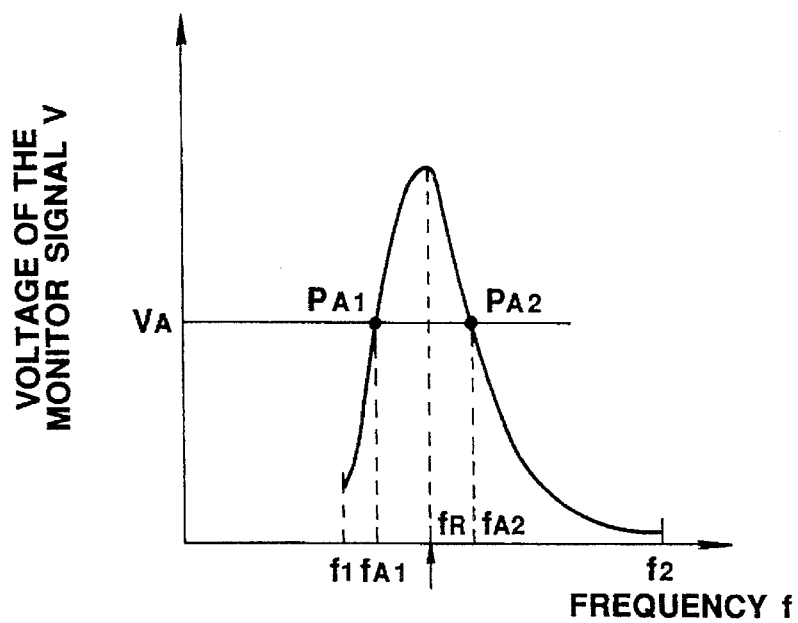
FIG. 10 is a graph showing the relationship between the voltage of the monitor signal and the driving frequency in a drive circuit for an ultrasonic motor of a prior art.
Figure 11:
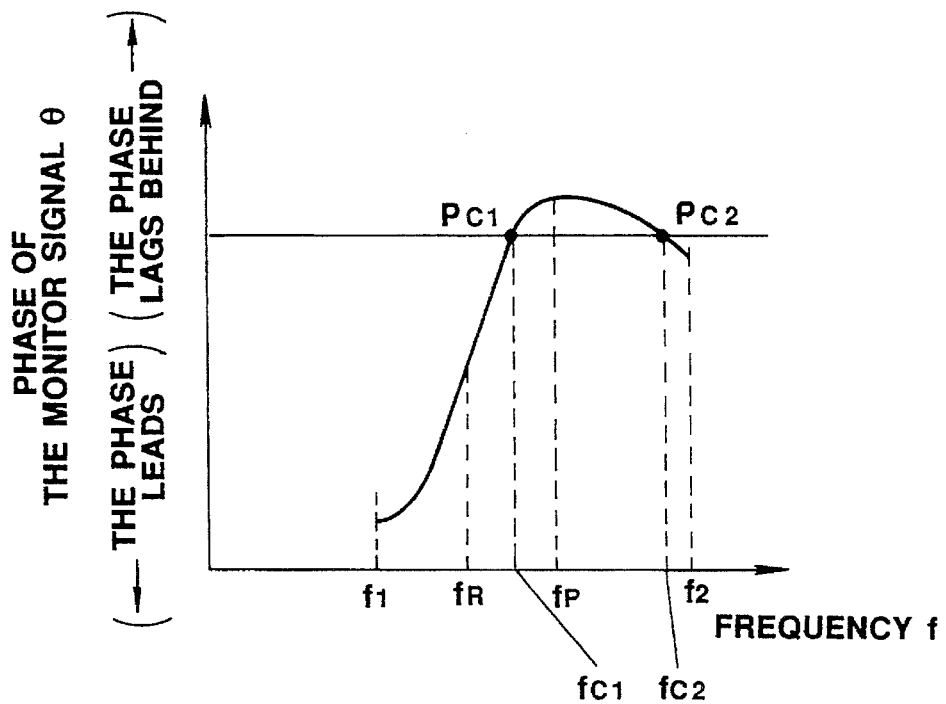
FIG. 11 is a graph showing the relationship between the phase of the monitor signal and the driving frequency in the drive circuit for an ultrasonic motor of a prior art.

FIG. 9 is a flowchart showing the operation of a CPU 15 in the sixth embodiment.

The sixth embodiment defines a permissible range in accordance with an output of an A/D converter as shown in the flowchart of FIG. 9. As is apparent from FIG. 4, if an output value of an A/D converter ADC1 becomes larger than a specified voltage $V_{TH}$ in accordance with specified timing, it is determined that a frequency is too low. Then, the frequency is raised (steps 15 and 16). If the frequency is lower than the specified voltage $V_{TH}$, the frequency is dropped (step 17).

According to the sixth embodiment, similar to the fifth embodiment, even if an ultrasonic motor falls to rotate due to a load variation, the ultrasonic motor can be restarted.

In the aforesaid first to sixth embodiments, counters 12, 14, and 14a may be analog counters such as voltage control oscillators. A signal used to indicate a reference to determine the timing of reaching a specified voltage is not limited to a pulse signal φ1 (See FIG. 3), but may be any of pulse signals φ2 to φ4 or a signal produced by shaping the waves of φA and φB signals (See FIG. 3). An ac signal having a period f0 (See FIG. 3) may not be oscillated but an ac signal having a period 4f0 (See FIG. 3) may be oscillated directly. A circuit for processing a monitor signal Sig1 may be configured using a reference voltage source and a comparator instead of a switching transistor and a Schmitt trigger. Furthermore, a driving frequency may be controlled using a combination of a logic circuit and an analog circuit instead of a CPU.

As described above, according to the present invention, even if a setting range of a driving frequency for an ultrasonic motor is reserved widely, optimization lock-on for the driving frequency can be achieved rapidly and precisely. When the ultrasonic motor applies to equipment whose conditions for use are diverse, the ultrasonic motor can be driven in a stable manner.

In the present invention, it will be apparent that a wide range of different working modes can be formed on the basis of this invention without departing from the spirit and scope of the invention. This invention is not restricted to any specific embodiment but should only be limited to the appended claims.

What is claimed is:

1. A drive circuit for an ultrasonic motor, comprising:
   an oscillator;
   a periodic signal generating means for dividing a frequency of a clock sent from said oscillator to generate a periodic signal having a specified frequency;
   an ac voltage generating means responsive to said periodic signal to generate an ac voltage for driving said ultrasonic motor;
   a monitor means for providing a monitor output signal indicating an operating state of said ultrasonic motor;
   a timing signal generating means responsive to said ac voltage generating means for generating a timing signal at a time the monitor output is expected to reach a specified value within a given period thereof and corresponding to a desired operating state of said ultrasonic motor;
   a means that in response to said timing signal sent from said timing signal generating means, compares said monitor means output with a specified voltage value which is not zero; and
   a frequency control means for controlling the specified frequency of said periodic signal generating means to operate said ultrasonic motor at said desired operating state, responsive to a state of an output of said comparing means.

2. A drive circuit for an ultrasonic motor according to claim 1, wherein when said frequency of said periodic signal is changed in a given direction, the time interval required for said monitor means output to come into agreement with said specified value varies in a given direction.

3. A drive circuit for an ultrasonic motor, comprising:
   an oscillator;
   a periodic signal generating means for dividing a frequency of clock pulses sent from said oscillator and generating a periodic signal having a specified frequency;
   an ac voltage generating means responsive to the periodic signal for generating an ac voltage for driving said ultrasonic motor;
   a monitor means attached to said ultrasonic motor to provide a monitor output indicating an operating state of said ultrasonic motor;

said periodic signal generating means including a timing signal generating means for generating a timing signal at a predetermined phase within a given period thereof;

a counting means that starts counting responsive to a timing signal sent from said timing signal generating means and counts up for a time elapsing when said monitor output reaches a specified voltage value which is not zero as determined by a comparison means; and a frequency control means that regulates a frequency of said periodic signal generating means by comparing a count value of said of said counting means with a count value representing a time that said ultrasonic motor reaches a desired operating state.

4. A drive circuit for an ultrasonic motor according to claim 3, wherein the count value representing the desired operating state of the ultrasonic motor is set in such a manner that when said frequency of said periodic signal is shifted in a given direction, the timing that said monitor output comes into agreement with said specified value will vary in a given direction.

5. A drive circuit for an ultrasonic motor according to claim 3, further comprising an abnormal state detecting means for detecting when a count value of said counting means is outside of a permissible operating range by comparing a count in said counting means with range values to indicate that said ultrasonic motor is in an abnormal state, and a clear means that, responsive to said abnormal state detecting means detecting an abnormal state, controls said frequency control means so that said frequency of said periodic signal is reset to an initial value.

6. A drive circuit for an ultrasonic motor according to claim 3, further comprising a timing means for determining an elapsed time that said counting means is counting and a clear means that, when a voltage value of said output of said monitor means does not come into agreement with said specified value even when said timing means indicates that a specified time has elapsed since said counting means started counting, said clear means, responsive thereto, controls said frequency signal control means so that a frequency of said periodic signal is reset to an initial value.

7. A drive circuit for an ultrasonic motor that is driven by an ac voltage and includes a monitor means for detecting an operating state, comprising:

a timing signal generating means for generating a signal at a time an output of said monitor means is expected to reach a specified value within a given period thereof, which specified value represents a desired operating state of said ultrasonic motor;

a comparing means that compares said monitor output with a specified voltage value which is not zero;

means responsive to said timing signal for examining the output of said comparing means; and a control means that controls said ac voltage in accordance with the examined output of said comparing means.

8. A drive circuit for an ultrasonic motor according to claim 7, wherein said specified value is set in such a manner that when said frequency of said ac voltage is shifted in a given direction, the timing that said monitor output comes into agreement with said specified value will vary in a given direction.

9. A drive circuit for an ultrasonic motor according to claim 7, wherein said control means comprises an oscillator and a counter that counts output pulses of said oscillator to generate an output at a set count, and a shift register that uses the output of said counter to output four pulse trains having different phases; said set count value of said counter being adjusted by said control means to control said frequency of said ac voltage.

10. A drive circuit for an ultrasonic motor that is driven by applying an ac voltage and includes monitor means for producing a monitor output voltage value in accordance with an operating state of said ultrasonic motor, comprising:

periodic AC voltage generating means;

trigger signal generating means for generating a trigger signal having a predetermined phase of said periodic ac voltage;

timing means that starts a counting operation in response to said trigger signal, and produces a count value by counting a time elapsing when said monitor output voltage value reaches a specified voltage value which is not zero; and frequency control means that controls said periodic ac voltage generating means by comparing a specified value representing a desired operating state of said ultrasonic motor with said count value of said timing means.

11. A drive circuit for an ultrasonic motor according to claim 10, further comprising means for setting said specified voltage value to a voltage value that is greater than zero and does not exceed a given peak voltage value of said monitor output voltage value, said specified voltage value being set at a voltage value sufficiently higher than zero so that said count value of said timing means changes by a significant amount when a frequency of an ac voltage generated by said periodic ac voltage generating means is shifted in a specified direction, and so that said count value of said timing means changes by a significant amount even when said monitor output voltage value has not substantially changed.

12. A drive circuit for an ultrasonic motor according to claim 10, wherein said frequency control means comprises an oscillator, a counter that inputs an output of said oscillator, and a shift register that uses an output of said counter to output four pulse trains having different phases; the set count value of said counter being controlled to control said frequency of said ac voltage.

13. A drive circuit for an ultrasonic motor according to claim 10, further comprising an abnormal state detecting means that detects, when an output of said timing means lies outside of a permissible range, that said ultrasonic motor is in an abnormal state, and clear means that, when said abnormal state detecting means detects an abnormal state, controls said frequency control means so that a frequency of said ac voltage will be reset to an initial value.

14. A drive circuit for an ultrasonic motor according to claim 10, further comprising:

maximum elapsing time detecting means for generating a maximum count value signal indicating when said count value reaches a maximum count value before said monitor output voltage value reaches said specified voltage value; and clear means for operating said frequency control means to reset a frequency of a periodic ac voltage generated by said periodic ac voltage generating means, when said maximum count value signal is generated by said maximum elapsing time detecting means.

15. A control circuit for an ultrasonic motor driven by AC voltage generating means, comprising:

a monitor means that provides a monitor output indicating an operating state of said ultrasonic motor;

a timing signal generating means that, responsive to the AC voltage generating means, generates a signal in accordance with a timing that said monitor output is expected to reach a specified value within a given period thereof, said specified value corresponding to a time when the ultrasonic motor reaches a desired operating state;

a comparing means that, in response to the timing signal sent from said timing signal generating means, provides a comparison of said monitor output with a specified voltage value which is not zero; and means responsive to the output of said comparing means for controlling the ac voltage generating means.

16. A control circuit for an ultrasonic motor according to claim 15, wherein said specified value is set in such a manner that when said frequency of said ac voltage shift in a given direction, the timing that said monitor output comes into agreement with said specified value will vary in a given direction.

17. A control circuit for an ultrasonic motor according to claim 16, further comprising a memory means that stores a value associated with said specified value; said comparing means comparing a value associated with an output of said memory means with said monitor output.

18. A control circuit for an ultrasonic motor according to claim 16, wherein said specified value is variable as a function of the type of ultrasonic motor and a desired operating state of an ultrasonic motor.

19. A drive circuit for an ultrasonic motor, said ultrasonic motor being driven by applying a periodic ac voltage and including monitor means for producing a monitor output voltage value in accordance with an operating state of said ultrasonic motor, said circuit comprising:

periodic ac voltage generating means for generating a periodic ac voltage waveform, said ac voltage generating means comprising means for varying a parameter value of said periodic ac voltage waveform;

trigger signal generating means for generating a trigger signal having a predetermined phase relationship with said periodic ac voltage waveform;

timing means for starting a counting operation in response to said trigger signal, and producing a count value by counting a time elapsing when said monitor output voltage value reaches a specified voltage value which is not zero; and control means for controlling said periodic ac voltage generating means based upon said count value produced by said timing means in order to change said periodic ac voltage waveform, said control means changing said periodic ac voltage waveform by comparing an expected count value, which indicates a favorable operating state of said ultrasonic motor, with said count value.

20. A control circuit for an ultrasonic motor according to claim 19, further comprising means for setting said specified voltage value to a voltage value that is greater than zero and does not exceed an expected peak voltage value of said monitor output voltage value, said specified voltage value being set at a voltage value sufficiently higher than zero so that said count value of said timing means changes by a significant amount when a frequency of an ac voltage generated by said periodic ac voltage generating means is shifted in a specified direction, and so that said count value of said timing means changes by a significant amount even when said monitor output voltage value has not substantially changed.

21. A control circuit for an ultrasonic motor according to claim 20, wherein said specified voltage value is variable as a function of the type of ultrasonic motor and a desired operating state of an ultrasonic motor.

22. A control circuit for an ultrasonic motor that, when two ac signals having different phases, generated by ac generating means, are applied to an electromechanical energy transducing element of said motor, generates a progressive oscillatory wave on a surface of an elastic body, comprising:

an electromechanical energy transducing element for monitoring said ultrasonic motor and that is activated with said progressive oscillatory wave and outputs a monitor signal indicating a state of said progressive oscillatory wave;

a voltage comparing means for comparing a comparison voltage different from a zero reference voltage of said monitor signal with the output of said transducing element;

a timing signal generating means responsive to one of said ac signals and a signal for producing said ac signals to generate a timing signal indicating a predetermined timing; and a frequency control means for adjusting said ac signal generating means based on an output of said voltage comparing means upon an occurrence of said timing signal to bring a voltage of said monitor signal into agreement with said comparison voltage.

23. A control circuit for an ultrasonic motor according to claim 22, wherein when said voltage comparing means provides a comparison output of either one of two states, and said frequency control means sets said ac signals to one of two predetermined frequencies responsive to an output state of said comparison output.

24. A control circuit for an ultrasonic motor according to claim 22, wherein said voltage comparing means further comprises a voltage dividing means for dividing said monitor signal and a switching means for performing a switching operation when the divided signal is at least equal to said non-zero comparison level which is a switching threshold of the switching means.

25. A control circuit for an ultrasonic motor according to claim 24, wherein said switching means is a switching transistor having an input coupled to said voltage dividing means and an output coupled to said frequency control means.

26. A control circuit for an ultrasonic motor according to claim 24, wherein said switching means is a Schmitt trigger having an input coupled to said voltage dividing means and an output coupled to said frequency control means.

27. A control circuit for an ultrasonic motor that, when two ac signals, generated by ac generating means and having different phases, are applied to an electromechanical energy transducing element of said motor, generates a progressive oscillatory wave on a surface of an elastic body, comprising:

an electromechanical energy transducing monitor element for monitoring said ultrasonic motor and being activated with said progressive oscillatory wave to output a monitor signal indicating a state of said progressive oscillatory wave;

a voltage comparing means having a comparison voltage value different from a zero voltage value of said monitor signal;

a time measuring means that, responsive to one of said ac voltages and a signal for producing said ac voltages measures a time elapsing until said voltage comparing means provides a given output; and a frequency control means that compares an output value of said time measuring means with a predetermined time value for controlling said ac generating means to control the frequencies of said ac signals in accordance with a result of a comparison.

28. A control circuit for an ultrasonic motor according to claim 27, wherein when said output of said time measuring means exceeds a predetermined value, said frequency control means sets said ac signals to a predetermined frequency.

29. A control circuit for an ultrasonic motor according to claim 27, wherein when said output of said time measuring means is outside a predetermined range, said frequency control means sets said ac signals to a predetermined frequency.

30. A method for driving an ultrasonic motor that when two ac signals having different phases are applied to an electromechanical energy transducing element of said motor, generates a progressive oscillatory wave on a surface of an elastic body, and that includes an electromechanical energy transducing element for monitoring which is activated with said progressive oscillatory wave and outputs a monitor signal indicating a state of said progressive oscillatory wave, comprising the steps of:

(a) counting a time interval from a specified phase of one of said ac signals and a signal producing said ac signals, detecting a predetermined elapsing time, and generating an output signal;

(b) comparing a specified non-zero voltage value with said monitor signal at a time corresponding to said output signal generated in step (a), said non-zero voltage value being sufficiently different from zero and in a range which does not exceed a peak value of said ac signals; and (c) controlling frequencies of said ac signals in accordance with a result of a comparison made in step (b).

31. A method of driving an ultrasonic motor, comprising the steps of:

(a) generating a progressive oscillatory wave on a surface of an elastic body of said motor by applying two ac signals having different phases to an electromechanical energy transducing element of said motor, said two ac signals being derived from a pulse signal;

(b) using said progressive oscillatory wave to activate an electromechanical energy transducing monitor element for monitoring attached to said elastic body and causing said electromechanical energy transducing element for monitoring to output a monitor signal indicating a state of said progressive oscillatory wave;

(c) using one of said ac signals and a signal for producing said ac signals to generate a timing signal indicating a predetermined timing that a monitor output is expected to reach a given non-zero value; and (d) controlling frequencies of said ac signals based on a comparison of a predetermined non-zero reference voltage with a value of said monitor signal at the time of the timing signal to bring a voltage of said monitor signal into agreement with said comparison voltage in accordance with said timing.

32. A drive circuit for an ultrasonic motor, comprising:

oscillator means for generating a clock signal;

means for dividing said clock signal to generate a periodic signal of a given frequency;

ac voltage generating means responsive to said periodic signal for generating an ac voltage for driving said ultrasonic motor;

monitor means providing a monitor output representing an operating condition of the ultrasonic motor;

timing signal generating means for generating a reference timing signal representing a timing that a monitor output is expected to reach a specified value which represents a desired operating state of said ultrasonic motor;

means for providing a non-zero reference voltage value;

means for comparing said monitor output with said reference value;

means for examining said means for comparing responsive to an occurrence of said timing signal; and frequency control means responsive to an output of said means for comparing at the time of said timing signal for adjusting said ac signal.

33. A method for controlling an ultrasonic motor, comprising the steps of:

(a) applying ac signals to an electromechanical energy transducing element of said ultrasonic motor;

(b) detecting the status of said ultrasonic motor and generating a signal representing the operating state;

(c) generating a reference timing signal representing a timing when said monitor signal is expected to reach a given, non-zero voltage level;

(d) detecting when a monitor signal reaches a given, non-zero value to develop a monitor timing signal;

(e) comparing said monitor timing signal with said reference timing signal; and (f) adjusting said ac signals responsive to said comparison.

34. The method of claim 33 wherein step (c) further comprises the steps of:

adjusting a count in a counter;

incrementing said counter for each oscillator clock pulse; and determining said reference timing when said counter reaches a given count.

35. The method of claim 34 wherein step (f) further comprises the step of changing a count in said counter.

36. A method according to claim 33 wherein step (d) further comprises the step of selecting the non-zero voltage value to assure that the non-zero timing values occur in sequential order for increasing operating frequencies of said ultrasonic motor.

37. The method of driving an ultrasonic motor comprising the steps of:

(a) generating oscillator pulses of a predetermined frequency;

(b) presetting predetermined counts in a pair of counters;

(c) advancing counts in said counters responsive to said clock pulses;

(d) generating ac signals responsive to an output of one of said counters;

(e) applying said ac signals to said ultrasonic motor;

(f) generating a signal representing an operating state of said ultrasonic motor;

(g) generating a reference timing pulse when the remaining one of said counters reaches a predetermined count;

(h) generating a timing signal when said monitor signal reaches a given non-zero value;

(i) comparing said timing signal with said reference timing pulse; and (j) changing the counts in said counters responsive to said comparison.

* * * * *